United States Patent
Mizuno et al.

(10) Patent No.: US 7,778,193 B2
(45) Date of Patent: Aug. 17, 2010

(54) RESIDENTIAL NETWORK SETTING METHOD, HOME GATEWAY APPARATUS, HOME GATEWAY PROGRAM, AND RECORDING MEDIUM

(75) Inventors: Shintaro Mizuno, Kodaira (JP); Kohji Yamada, Ebina (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 684 days.

(21) Appl. No.: 10/558,889

(22) PCT Filed: Jun. 2, 2005

(86) PCT No.: PCT/JP2005/010124

§ 371 (c)(1),
(2), (4) Date: Dec. 2, 2005

(87) PCT Pub. No.: WO2005/122492

PCT Pub. Date: Dec. 22, 2005

(65) Prior Publication Data

US 2006/0280127 A1    Dec. 14, 2006

(30) Foreign Application Priority Data

Jun. 7, 2004    (JP)    ............................. 2004-168264

(51) Int. Cl.
*H04J 1/16* (2006.01)
*H04L 12/28* (2006.01)
*H04L 12/56* (2006.01)
*G06F 15/177* (2006.01)
*G06F 15/16* (2006.01)

(52) U.S. Cl. ........................ 370/252; 370/254; 370/389; 370/401; 709/222; 709/227

(58) Field of Classification Search ................... 370/401
See application file for complete search history.

(56) References Cited

U.S. PATENT DOCUMENTS 6,748,080 B2*    6/2004    Russ et al. .................. 380/239

(Continued)

FOREIGN PATENT DOCUMENTS

AO    1 338 961 A2    8/2003

(Continued)

OTHER PUBLICATIONS

Shintaro Mizuno et al., "A new remote configurable firewall system for home-use gateways", 2005 IEEE Consumer Communications and Networking Conference, 2005.

(Continued)

*Primary Examiner*—Daniel J Ryman
*Assistant Examiner*—Cassandra Decker
(74) *Attorney, Agent, or Firm*—Oblon, Spivak, McClelland, Maier & Neustadt, L.L.P.

(57) ABSTRACT

The setting of the connection of devices to a home gateway apparatus is simplified by providing the apparatus with a gateway function interconnecting a residential network and an external network; a database holding information setting the states of devices getting connected to the residential network and software for the setting, as settings information for each device; and a device setting processing part, setting, for a device newly requesting connection, the state of the device via the residential network by using the settings information, and, when getting accessed from the external network, making settings, with respect to the gateway function for making the firewall settings and the network address translation settings, on the basis of the network information further included in the settings information and the IP address granted to the device.

15 Claims, 19 Drawing Sheets

U.S. PATENT DOCUMENTS

| | | | |
|---|---|---|---|
| 6,968,376 B2 * | 11/2005 | Horie et al. | 709/224 |
| 7,237,260 B2 * | 6/2007 | Yu et al. | 726/11 |
| 7,243,141 B2 * | 7/2007 | Harris | 709/220 |
| 7,382,786 B2 * | 6/2008 | Chen et al. | 370/401 |
| 7,389,516 B2 * | 6/2008 | Rosenbloom et al. | 719/321 |
| 2002/0029256 A1 | 3/2002 | Zintel et al. | 709/218 |
| 2002/0046349 A1 | 4/2002 | Saito | 713/201 |
| 2003/0135596 A1 * | 7/2003 | Moyer et al. | 709/223 |
| 2004/0249923 A1 * | 12/2004 | Ko et al. | 709/223 |
| 2005/0021603 A1 * | 1/2005 | Yokomitsu et al. | 709/203 |
| 2005/0108430 A1 * | 5/2005 | Howarth et al. | 709/245 |

FOREIGN PATENT DOCUMENTS

| | | |
|---|---|---|
| JP | 2002-77274 | 3/2002 |
| JP | 2002-247668 | 8/2002 |
| JP | 2002-354556 | 12/2002 |
| JP | 2003-208366 | 7/2003 |
| JP | 2003-283550 | 10/2003 |
| JP | 2003-298617 | 10/2003 |
| JP | 2003-348116 | 12/2003 |
| JP | 2004-21325 | 1/2004 |
| JP | 2004-078570 | 3/2004 |
| JP | 2004-128532 | 4/2004 |
| WO | WO 02/37217 A2 | 5/2002 |
| WO | WO 02/51076 A1 | 6/2002 |

OTHER PUBLICATIONS

Joe Desbonnet, et al., "System Architecture and Implementation of a CEBus/Internet Gateway", vo. 43, No. 4, XP-011008490, Nov. 1, 1997, pp. 1057-1062.

Peter M. Corcoran, et al., "Browser-Style Interfaces to a Home Automation Network", vo. 43, No. 4, XP-011008489, Nov. 1, 1997, pp. 1063-1069.

* cited by examiner

MANUFACTURER NAME: MANUFACTURER 1
DEVICE NAME: NETWORK CAMERA a
PRODUCT NUMBER: 4-123456-789012
DEFAULT IP ADDRESS OF DEVICE: 192.168.0.10
EXTERNAL SUPPLY PORT: TCP: 80
DEVICE SETTING INTERFACE: HTTP
NETWORK SETTING COMMANDS:
   COMMAND 1: POST config.cgi
          data : password=root, dhcp=1, dns=auto
   COMMAND 2: POST restart.cgi
          data : password=root, restart=yes

SETTINGS INFORMATION FILE   F1

FIG. 6A

MANUFACTURER NAME: MANUFACTURER 2
DEVICE NAME: VIDEO SERVER X
PRODUCT NUMBER: 4-654321-098765
DEFAULT IP ADDRESS OF DEVICE: 10.0.0.23
EXTERNAL SUPPLY PORT: TCP: 443
DEVICE SETTING INTERFACE: UDP 8765
NETWORK SETTING COMMANDS:
   COMMAND 1: data: [base64 binary data]
   COMMAND 2: data: [base64 binary data]

SETTINGS INFORMATION FILE   F2

FIG. 6B

MANUFACTURER NAME: MANUFACTURER 3
DEVICE NAME: VIDEO SERVER Z2
PRODUCT NUMBER: 4-111111-222222
DEFAULT IP ADDRESS OF DEVICE: 10.0.0.100
EXTERNAL SUPPLY PORT: UDP: 1234, UDP: 3456, TCP: 5678
DEVICE SETTING INTERFACE: command.bin
NETWORK SETTING COMMANDS:
　　COMMAND 1: exec command.bin-arg1-arg2

SETTINGS INFORMATION FILE　　F3

FIG. 7A

MANUFACTURER NAME: MANUFACTURER 4
DEVICE NAME: MUSIC SERVER
PRODUCT NUMBER: 4-121212-343434
EXTERNAL SUPPLY PORT: N/A
DEFAULT IP ADDRESS OF DEVICE: N/A
DEVICE SETTING INTERFACE: UPnP
INSTANT REGISTRATION OF PACKET FILTERS: no

SETTINGS INFORMATION FILE　　F4

FIG. 7B

| DEVICE NAME | DEVICE ID | PRODUCT NUMBER | DEVICE HARDWARE ADDRESS | DEVICE IP ADDRESS | EXTERNAL IP ADDRESS | DEVICE PROTOCOL, DEVICE PORT NUMBER | EXTERNAL PROTOCOL, EXTERNAL PORT NUMBER | REGISTRATION EXECUTION FLAG |
|---|---|---|---|---|---|---|---|---|
| DEV1 | ID1 | 4-123456-789012 | 12-34-56-78-90-12 | 192.168.1.2 | 10.0.0.171 | TCP:80 | TCP:80 | |
| DEV2 | ID2 | 4-654321-098765 | ab-cd-ef-12-34-56 | 192.168.1.3 | 10.0.0.171 | TCP:443 | TCP:443 | |
| DEV3 | ID3 | 4-111111-222222 | 1a-2b-3c-4d-5e-6f | 192.168.1.4 | 10.0.0.171 | UDP:1234<br>UDP:4312<br>TCP:5678 | UDP:1234<br>UDP:3456<br>TCP:5678 | |
| DEV4 | ID4 | 4-121212-343434 | 11-22-33-44-55-66 | 192.168.1.5 | 10.0.0.172 | TCP:80 | TCP:80 | No |

REGISTERED DEVICE INFORMATION TABLE 101T

FIG. 8

SETTINGS INFORMATION FILE F1 OF DEVICE DEV1

MANUFACTURER NAME: MANUFACTURER 1
DEVICE NAME: NETWORK CAMERA a
PRODUCT NUMBER: 4-123456-789012
DEFAULT IP ADDRESS OF DEVICE: 192.168.0.10
EXTERNAL SUPPLY PORT: TCP: 80
INSTANT REGISTRATION OF PACKET FILTERS: YES
DEVICE SETTING INTERFACE: HTTP
NETWORK SETTING COMMANDS:
    COMMAND 1: POST config.cgi
        data : password=root, dhcp=1, dns=auto
    COMMAND 2: POST restart.cgi
        data : password=root, restart=yes

FIG. 14A

SETTINGS INFORMATION FILE F2 OF DEVICE DEV2

MANUFACTURER NAME: MANUFACTURER 2
DEVICE NAME: VIDEO SERVER X
PRODUCT NUMBER: 4-654321-098765
DEFAULT IP ADDRESS OF DEVICE: 10.0.0.23
EXTERNAL SUPPLY PORT: TCP: 443
DEVICE SETTING INTERFACE: UDP 8765
NETWORK SETTING COMMANDS:
   COMMAND 1: data: [base64 binary data]
   COMMAND 2: data: [base64 binary data]

FIG. 14B

| DEVICE NAME | DEVICE ID | PRODUCT NUMBER | DEVICE HARDWARE ADDRESS | DEVICE IP ADDRESS | EXTERNAL IP ADDRESS | DEVICE PROTOCOL, DEVICE PORT NUMBER | EXTERNAL PROTOCOL, EXTERNAL PORT NUMBER | REGISTRATION EXECUTION FLAG |
|---|---|---|---|---|---|---|---|---|
| DEV1 | ID1 | 4-123456-789012 | 12-34-56-78-90-12 | 192.168.1.2 | 10.0.0.171 | TCP:80 | TCP:80 | Yes |
| DEV2 | ID2 | 4-654321-098765 | ab-cd-ef-12-34-56 | 192.168.1.3 | 10.0.0.171 | TCP:443 | TCP:443 | |
| DEV3 | ID3 | 4-111111-222222 | 1a-2b-3c-4d-5e-6f | 192.168.1.4 | 10.0.0.171 | UDP:1234<br>UDP:4312<br>TCP:5678 | UDP:1234<br>UDP:3456<br>TCP:5678 | |
| DEV4 | ID4 | 4-121212-343434 | 11-22-33-44-55-66 | 192.168.1.5 | 10.0.0.172 | TCP:80 | TCP:80 | |

REGISTERED DEVICE INFORMATION TABLE 101T

FIG. 15

DEFAULT REGISTERED PORT LIST

SETTINGS INFORMATION FILE

RESIDENTIAL NETWORK SETTING METHOD, HOME GATEWAY APPARATUS, HOME GATEWAY PROGRAM, AND RECORDING MEDIUM

TECHNICAL FIELD

The present invention pertains to a home gateway apparatus interconnecting a residential network and an external network, a setting method for the residential network between a device connected to the residential network and the home gateway apparatus, and a program for implementing these on a computer, and in particular attempts to provide a residential network setting method and a home gateway apparatus capable of implementing settings with simple operation, without putting a burden on the user.

BACKGROUND ART

Broadband network environments have spread as far as ordinary households and, also, residential network environments are in the process of becoming implemented by the spread of Wireless LAN (Local Area Network) and the like.

Starting with digital home appliance devices like hard disk recorders, television sets, and surveillance cameras, and including desired white goods like refrigerators, articles that can be connected to a residential network are gradually entering the stage, so it is believed that networking in the home will increasingly move forward.

However, in order to connect network devices to a residential network, it has been necessary to do things like re-modifying network settings for a personal computer and a router and newly installing software in the personal computer.

In this manner, it has been necessary for the user to individually make the settings for the network connection of the device itself and the settings of the firewall and the network address translation in order to protect the residential network from illicit access from the outside, the effort and degree of difficulty of which are becoming a problem.

For the simplification of the settings, there conventionally existed, as a method for making the settings of devices in the home via a home gateway, the method as described in Patent Reference 1 and Patent Reference 2, of downloading files for controlling the devices as well as files for the user interface display from a server on an external network and, display, on a control terminal, an interface for device control using the web server incorporated in the home gateway; and, as a method for automatically making the settings of the firewall, the method as described in Patent Reference 3 of disposing apparatuses named network outlets within the residential network, having these network outlets hold settings information, and supplying, with respect to requests from the home gateway, information needed for the connection of network devices from the network outlets.

Also, "Universal Plug and Play" (below "UPnP") [for details, refer to http://www.upnp.org/] is proposed as a communication standard for the plug and play of network devices.

Patent Reference 1: Japanese Patent Application Laid Open No. 2004-021325.

Patent Reference 2: Japanese Patent Application Laid Open No. 2002-247668.

Patent Reference 3: Japanese Patent Application Laid Open No. 2003-348116.

PROBLEM TO BE SOLVED BY THE INVENTION

Although, in these conventional techniques, there is provided a simple interface to the user for performing control of the devices, it has not been possible to implement a simplification of settings for both the user's network and packet filters of firewalls etc. without adding and modifying the functionality of existing devices.

Particularly in UPnP, there is a need to add UPnP functionality to the devices and also, in case not all the devices support UPnP, it has been necessary for the user to independently set the non-supporting devices.

It is an object of the present invention to make network settings easily through the interfaces that each device currently has, while at the same time making it possible to make the home gateway's own firewall settings, the dynamic allocation of port numbers for network address translation, and the like, without requiring alterations to existing devices, and to make it possible to perform, with convenient operation by the user, installation of devices in a residential network.

MEANS FOR SOLVING PROBLEM

According to the present invention, there are provided a gateway function interconnecting at least a residential network and an external network and a database holding, for each device, settings information for setting devices getting connected to said residential network; a residential network setting method for making connection settings for connecting new devices to said residential network, comprising:

(a) a step of receiving a connection setting request and acquiring attribute information pertaining to said device, (b) a step of querying said database for said attribute information and, in case settings information for the corresponding device is present in said database, acquiring the settings information from said database and executing the settings for the device and the settings for the gateway function, and, in case the corresponding settings information is not present in said database, accessing an information-providing server connected to the external network via said gateway function and acquiring the desired settings information from the information-providing server, and (c) a step of holding said settings information in said database together with executing the settings for the corresponding device and the gateway function.

The home gateway apparatus according to this invention is configured so as to include:

a gateway function interconnecting a residential network and an external network;

a database for holding information for setting the states of devices getting connected to the residential network as well as software for the setting, as settings information for each device;

a device setting means for setting, for a device newly requesting a connection, the state of said device via said residential network by using said settings information; and a gateway setting means for making settings with respect to the gateway function for making firewall settings and network address translation settings in case of getting accessed from an external network, on the basis of network information included in said settings information and an IP address given to said device.

EFFECTS OF THE INVENTION

According to the present invention, the user is able, just by the user's performing, with respect to a home gateway, a simple device designation concerning the device which he attempts to start using, to automatically perform device settings, network settings for the connection to the residential network, as well as firewall and network address translation settings of the home gateway.

BRIEF DESCRIPTION OF THE DRAWINGS

FIG. 6A is a diagram showing a first example of a settings information file, and FIG. 6B is a diagram showing a second example of a settings information file;

FIG. 7A is a diagram showing a third example of a settings information file for settings information, and FIG. 7B is a diagram showing a fourth example of a settings information file;

FIG. 8 is a diagram showing an example of a table of registered device information;

FIG. 14A is a diagram showing a first example of a settings information file, used in the embodiment of FIG. 13, and FIG. 14B is a diagram showing a second example of a settings information file, used in the embodiment of FIG. 4;

FIG. 15 is a diagram showing an example of a table of registered device information used in the embodiment of FIG. 13;

BEST MODES FOR IMPLEMENTING THE INVENTION

The gateway apparatus is mainly composed of a computer. In the gateway apparatus composed of a computer, there is provided a database, and in this database, settings information for devices expected to newly request a connection to a residential network is stored.

When the device is connected to the residential network and the connection request is given to the home gateway apparatus, the computer constituting the home gateway apparatus reads the attributes (e.g. the manufacturer name, the product model number, the serial number, etc., of the device) of the device wishing for a connection, acquires the settings information corresponding to those attributes from the database, sets the state of the device having requested a connection in accordance with the acquired information, and again executes the settings with respect to the home gateway apparatus.

In case the settings information is not present in the database, it acquires the latest settings information from an information-providing server connected to an external network, and executes, in accordance with this settings information, the settings of the device having requested the connection as well as of the home gateway apparatus itself. Together with this, it stores in the database the latest settings information acquired from the information-providing server, and reinforces the ability to respond of the database.

First Embodiment

Figure 1:
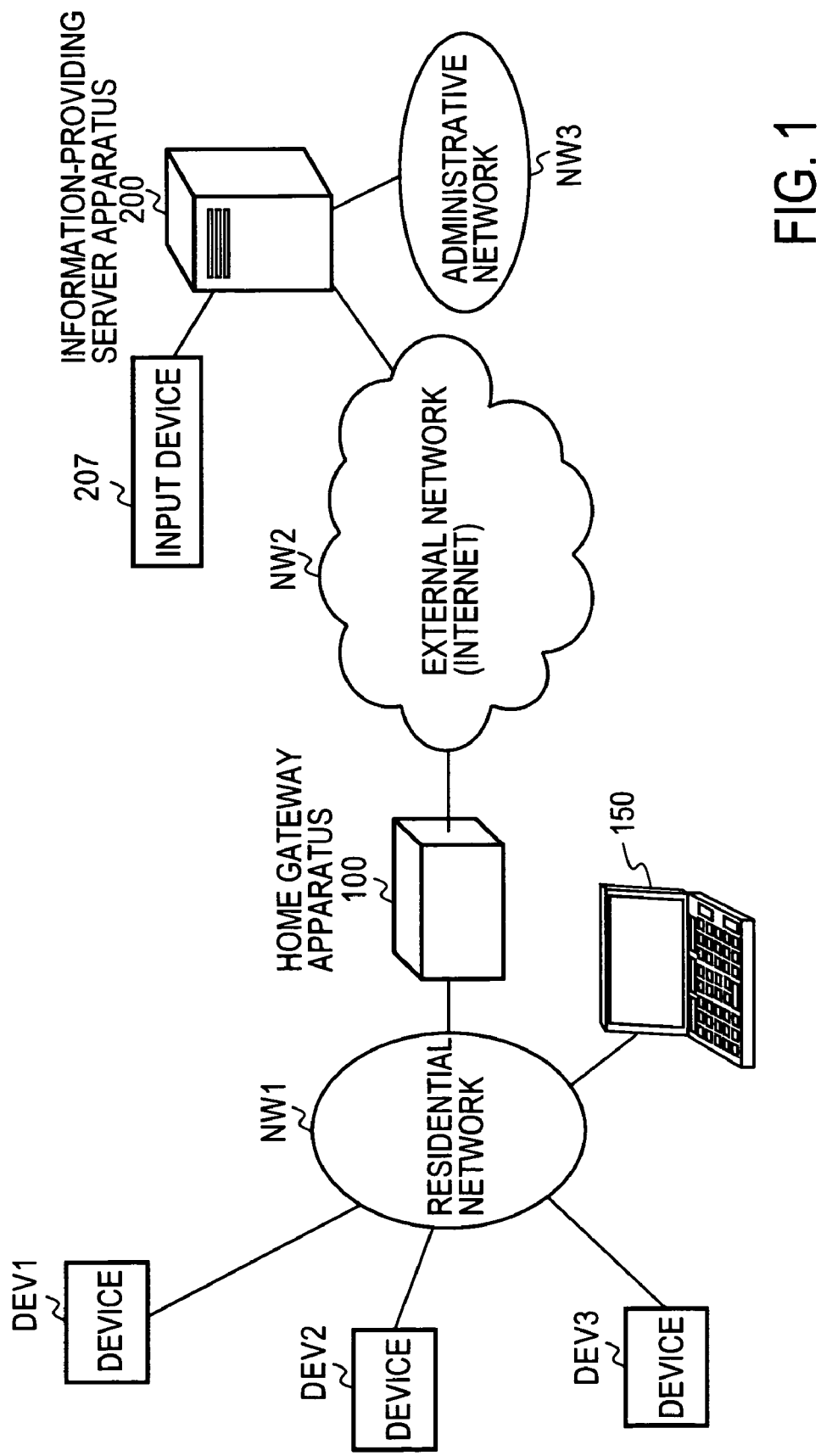
FIG. 1 is a block diagram of a network system to which this invention is applied.

The configuration of a network system to which the present invention is applied is shown in FIG. 1.

The present system consists of a home gateway apparatus 100 connecting the Internet NW2, being an external network, and a residential network NW1, an information-providing server 200 connected to the external network NW2 and providing settings information to the home gateway apparatus 100, and an administrative network NW3 for administering information-providing server apparatus 200. In the residential network NW1, there are connected a personal computer 150 having e.g. an entry means and a display means, and one or more devices DEV1, DEV2, DEV3 such as e.g. home appliance products.

Information-providing server apparatus 200 is managed by a home gateway provider or a home appliance device manufacturer.

Figure 2:
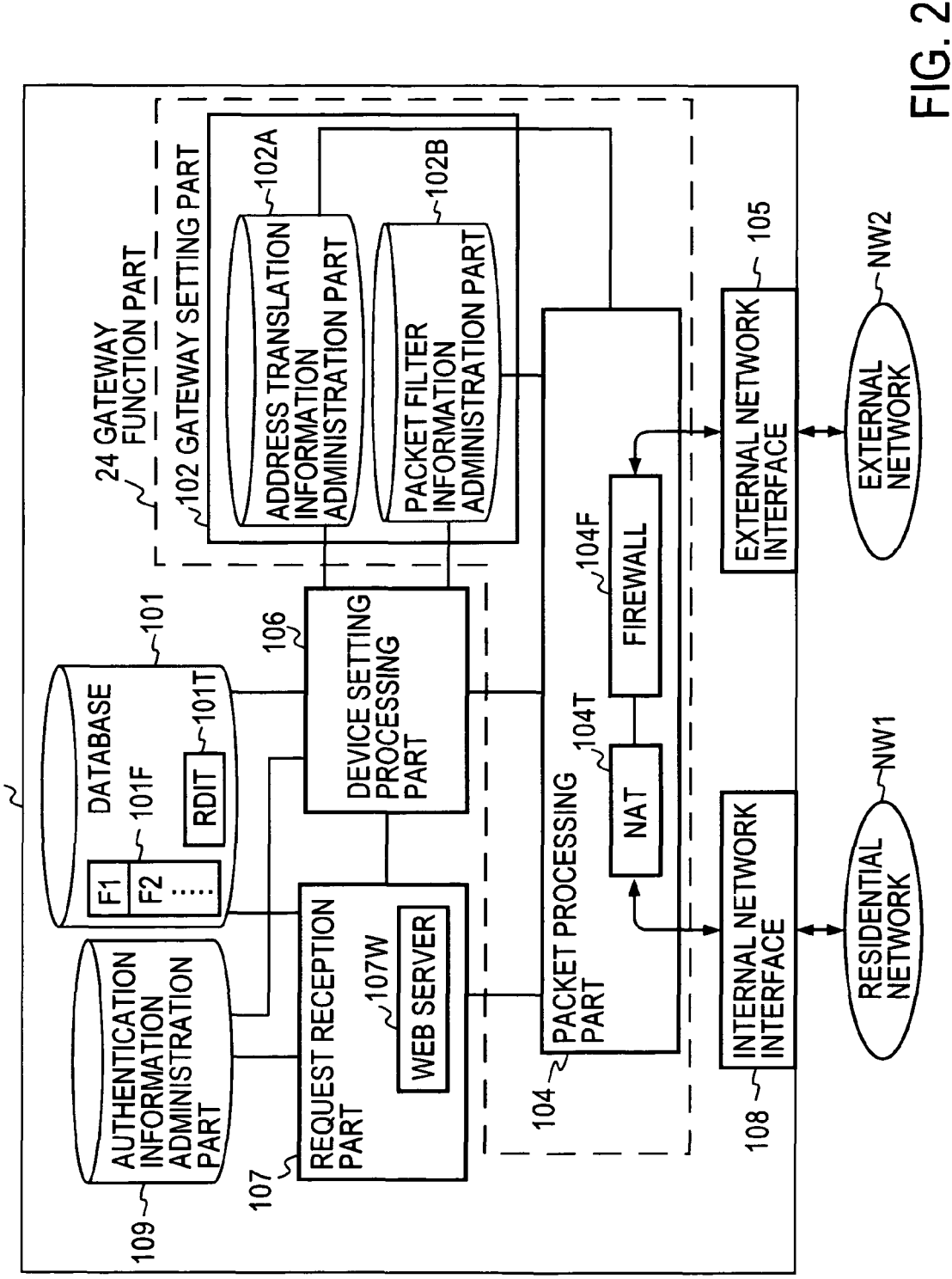
FIG. 2 is a block diagram for explaining the configuration of a home gateway apparatus of the present invention, in the system shown in FIG. 1.

As shown in FIG. 2, the home gateway apparatus 100 comprises an external network interface 105 connected with the external network NW2 and an internal network interface 108 connected with the residential network NW1; a packet processing part 104 processing input/output packets from these interfaces 105 and 108; a request receiving part 107 for receiving device registration requests from the user; a device settings processing part 106 for performing processing for device settings in response to requests processed by the request receiving part 107; a database 101 for holding a settings information file 101F utilized for the device settings and a registered device information table 101T (registered device information table, expressed as RDIT in the figure) in which information on set devices is stored; an address translation information administration part 102A for holding and administering information (a set of device IP addresses and device port numbers and a set of external IP addresses and external port numbers) needed for network address translation (NAT) by a network address translation part 104T in the packet processing part 104 and a packet filter information administration part 102B for holding and administering information (external IP addresses and external port numbers with respect to used protocols) needed for packet filtering by a firewall 104F; and an authentication information administration part 109 for holding and administering passwords, keys, certificates, and the like, for use in the authentication of the user and authentication with the information-providing server 200.

The network address translation part 104T makes a translation, by consulting the address translation information administration part 102A, from the set of the source local IP address (device IP address) and the used internal port number (device port number) of a packet received e.g. from an arbitrary device in the residential network NW1, into a set of a global IP address and an external port number, and inversely, translates the set of the destination global IP address and the external port number of a packet received from the external network NW2 and approved by the firewall 104F, by consulting the address translation information administration part 102A, into a set of a local IP address and an internal port number. The device IP address is an address supplied in advance by the user or the home gateway apparatus.

The firewall 104F consults the packet filter information administration part 102B, based on either the source global IP address and/or the external port number, or the destination IP address and/or the port number, of the packet whose address has been translated by the network address translation part 104T and attempts to be transmitted to the external network NW2, and permits or forbids the transmission of the packet. Also, based on either the destination global IP address and/or the external port number, or the source IP address and/or the port number, of the packet received from the external network NW2, it consults the packet filter information administration part 102B and permits or forbids the transit of the packet.

Inside the device settings processing part 106, the address of the information-providing server 200 is stored in advance, and a mode is adopted wherein the information-providing server 200 can be accessed at any time by a web server 107W. Also, the address translation information administration part 102A and the packet filter information administration part 102B constitute a gateway settings part 102. The packet processing part 104 and the gateway settings part 102 constitute a gateway function part 24.

It is acceptable to ship the home gateway apparatus 100 in a state wherein settings information file 101F is stored in advance in the database 101 by either the manufacturer or the service provider using the home gateway.

In the present embodiment, the request receiving part 107 comprises a web server which can only be accessed from the residential network NW1, and receives a setting request of e.g. a device DEV1 to be newly connected, generated by the user by using a Web browser installed in the personal computer 150. Alternatively, the setting request may be generated by using a web browser function that the device itself possesses.

Moreover, in order to choose address granting based on the dynamic host configuration protocol (DHCP) for the setting of the IP address of the device, a DHCP server functionality may be incorporated into the device settings processing part 106.

Figure 3:
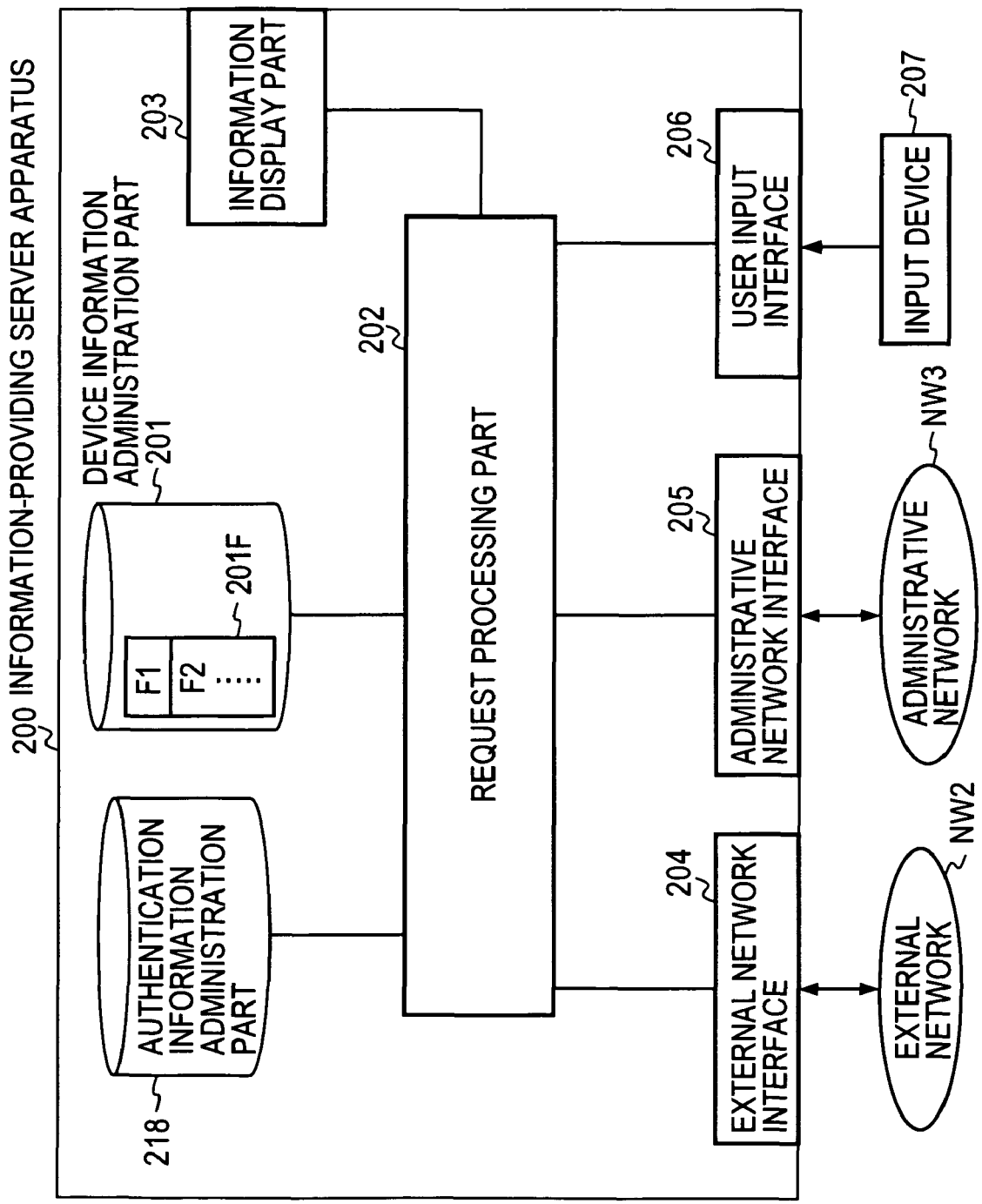
FIG. 3 is a block diagram for explaining the configuration of an information-providing server, in the system shown in FIG. 1.

As shown in FIG. 3, the information-providing server 200 is composed of an external network interface 204 for connection to the external network NW2; an administrative network interface 205 for connection to the administrative network NW3 for administration of this information-providing server 200; a user input interface 206 for directly receiving registrations from an administrator using an input device 207; a request processing part 202 for processing registration requests and information requests input from these interfaces 204, 205, 206; a device information administration part 201 for holding and administering settings information of devices for which connection requests are expected; an information display part 203 for displaying information to the administrator; and an authentication information administration part 218 for holding and administering passwords, keys, certificates, and the like, for the sake of authentication with the home gateway apparatus 100 and authentication of the administrator.

The registration and download request of the settings information to the information-providing server apparatus 200 can be received from any one of the external network interface 204, the administrative network interface 205, and the user input interface 206, but for the sake of security, it is also possible to restrict the interfaces receiving the request.

In addition, the communication protocol between the home gateway apparatus 100 and the information-providing server apparatus 200 may be standard internet protocols such as HTTP (Hyper Text Transfer Protocol), SSL (Secure Sockets Layer), and SOAP (Simple Object Access Protocol) and is not specified in particular in the present invention.

The settings information for the connection settings with respect to devices which are expected to request a connection to the residential network NW1 is stored as a settings information file 201F in the device information administration part 201 of the information-providing server 200. As shown for the examples of the four settings information files F1 to F4 in FIGS. 6 and 7, the device name, the name of the device manufacturer, the product number, the default IP address of the device at the time of shipping, interface information for setting the device, commands to execute the interfaces, etc., are described in the settings information files.

In the case of the settings information file F1 shown in FIG. 6A, the device setting interface is the HTTP protocol, and it is described that it is possible to make a change of the settings to the settings using DHCP in order that the home gateway apparatus 100 be able to administer the network settings of the device being set, by transmitting two POST commands 1 and 2 with respect to the device being set.

In settings information file F2 shown in FIG. 6B, it is described that it is possible to make a setting to a network address administered by the home gateway apparatus 100 by transmitting specific binary data with respect to UDP (User Datagram Protocol) port 8765.

In the case of settings information file F3 shown in FIG. 7A, there is described the setting of the device by means of software operating on the home gateway apparatus 100. In this case, software for the setting is also held as well as the settings information file in the home gateway apparatus 100.

In the settings information file F4 shown in FIG. 7B, since the device being set has UPnP functionality and the device itself makes its own settings with UPnP, it is described that the home gateway apparatus 100 operates in accordance with the UPnP standard. Regarding the device address, the home gateway apparatus 100 automatically makes appropriate settings using the UPnP protocol. Since a device adapted to the UPnP protocol can ordinarily acquire automatically the device port number and the device IP address directly from the device, settings information concerning those are not necessary, and are considered as N/A (Not Available). Also, since UPnP is used in this example, and since packet filter settings and address translation information settings are made automatically between the device and the gateway, for the settings based on the settings information file F4, there is provided within the settings information the designation ("no" flag for non-registration) that the registration of packet filters and address translation information is not executed.

The settings information files shown in FIGS. 6 and 7 are settings information files for the case that registration of packet filters and address translation information is executed.

In the settings information files F1 to F3, there is no designation as to whether registration of packet filters and address translation information is executed, but registration of packet filters and address translation information is executed by default. Since, for certain devices, registration of packet filters and address translation information is not performed, it is necessary to register that designation within the settings information file of that device, as shown in FIG. 7B. In the case of FIG. 7B, since there is the "no" flag, as mentioned above, packet filters and address translation information are not registered.

The information for a registered device includes, as shown in FIG. 8, the device name, the device identifier, the product number, the device hardware address, the allocated device IP address, the device protocol and port number, the external address, the external protocol, and the external port number and registration execution flag for those, etc., and is stored in the database 101 provided in the home gateway apparatus 100, shown in FIG. 2, as registered device information table 101T. The registered device information table 101T is consulted at the time of the connection of the device to the network NW1 for the sake of checking whether that device information has already been registered, or later in the case of executing the registration by the user or another program with respect to a device for which the registration flag is "no".

[Explanation of Operation]

Under normal conditions, the home gateway apparatus 100 performs a transfer of packets via the packet processing part 104 between the internal network interface 108 and the external network interface 105 shown in FIG. 2, packets being transferred from the residential network NW1 to the external network NW2 or from the external network NW2 to the residential network NW1, and supports the desired communication state. However, in this case, the network address translation part 104T and the firewall 104F are provided in the packet processing part 104 as mentioned above, and a translation between local IP addresses and global IP addresses is performed as mentioned above, in addition to which only packets from the device registered in advance, or packets whose transit have been permitted in advance, pass through the packet processing part 104, and the desired communication or control is attained.

Below, the operation in the case of registration of a new device, considered to be a main objective of the present invention, will be explained using FIG. 4.

In request receiving part 107, shown in FIG. 2, there is provided a web server 107W, which receives a setting request of the new device, generated by the user's manipulation, from a terminal (a personal computer 150 or a device such as a television set possessing input/output means and a display function) possessing a web server to which e.g. the residential network NW1 is connected (Step S101). At this juncture, an authentication of the user may be performed on the web display using the authentication information administration part 109. It is possible to perform the designation of the device requesting settings by the device name or the manufacturer name or product number, etc.

The home gateway apparatus 100 checks whether the settings information file of the designated device is held in the database 101 (Step S102), and, in case the settings information file (e.g. of FIG. 6A) of the corresponding device was found in the database 101, the device settings processing part 106 reads the settings information file (Step S103), and a reply request with respect to the default IP address (192.168.0.10 in the example of FIG. 6A) of the device described in the settings information file is emitted (Step S104).

It is checked whether there is a reply from the concerned device (Step S105), and if there is a reply, it is determined that the device is present in the residential network; it is checked whether the information for the concerned device is present in the registered device information table 101T within the database 101 shown in FIG. 8 (Step S106), and if it is registered, the process moves to Step S1110 to reply back to the user that the setting is completed. If it was determined in Step S106 that the information for the device was not registered, device setting is made on the basis of information like e.g. the device IP address and the port number for the used protocol, described in the settings information file (Step S107).

It is determined whether the setting of the device has succeeded (Step S108), and, in case of success, information such as the name, the identifier, the product number, the device hardware address, protocol and port number, the allocated IP address, the external IP address, and the external port number is additionally registered in the registered device information table 101T shown in FIG. 8, within the database 101, together with registering packet filter information (e.g. the external IP address and the external port number) in the packet filter information administration part 102B, and network address translation information (the set of the device IP address and the device port number and the set of the external IP address and the external port number) is registered in the address translation information administration part 102A (Step S109). By this registration, the translation between the local IP address and the global IP address in the network address translation part 104, and the transit of packets having a designated external address (global address) through the firewall 104F, become possible. Further, in this embodiment, an example was explained wherein packet filters and network address translation information is registered, but, as will be described subsequently, it is acceptable not to execute these registrations by default and only execute registrations in designated cases.

After completion of registration, the completion of registration is reported to a terminal having a Web browser connected to residential network NW1, reporting the result to the user (Step S110).

In case, in Step S102, the settings information file of the concerned device was not found in database 101, it is checked by testing whether it is possible to make an access with respect to the address of the information-providing server apparatus 200 pre-registered in the device settings processing part 106, and checked whether the information-providing server apparatus 200 is present or not (Step S111). If access can be made, the settings information file of the concerned device (Step S112) is requested and it is determined whether a reply including the settings information file with respect to the request (Step S113) has been received. In case, in Step S112, the request is sent to the information-providing server 200, it is acceptable to perform signing and encryption of the request, using the public key of the information-providing server apparatus 200 held in the authentication information administration part 109 and the key held in each home gateway.

When the settings information file from the information-providing server apparatus 200 is received, the settings information file is saved in the database 101 (Step S114), the process moves to Step S104 and makes the settings of the concerned device, registration in the registered device information table 101T, and the settings of the gateway setting part 102 in the same way as in Steps S104 to S110 mentioned above. In case, in Step S111, the information-providing server apparatus 200 is not found, or in case the settings information file needed for the information-providing server apparatus 200 is not found, or in case there is again no response from the server in Step S113, or in case device setting fails, it returns an error response to the user (Step S115).

Figure 5:
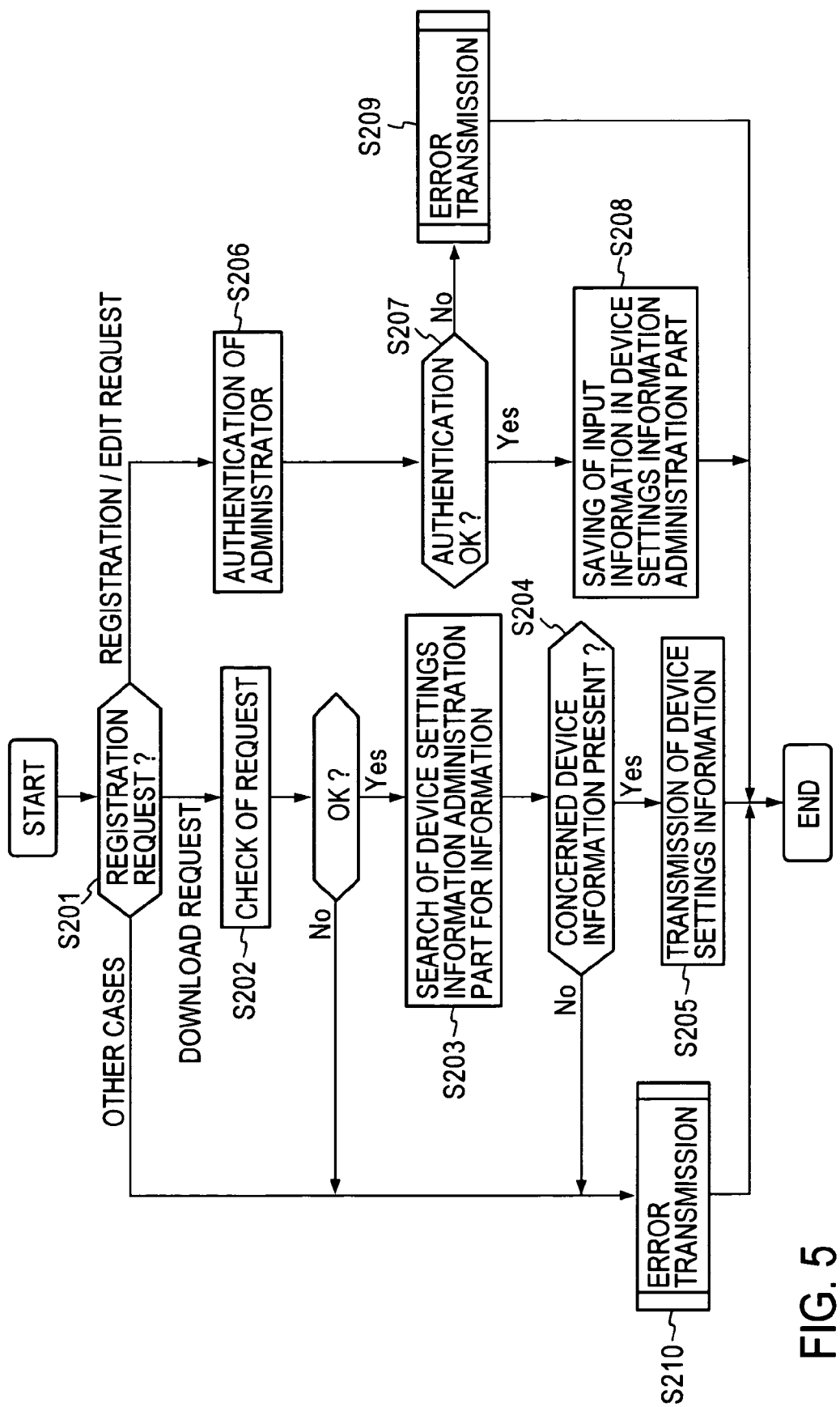
FIG. 5 is a flowchart for explaining the operation of the information-providing server shown in FIG. 3.

The process flow of the information-providing server apparatus 200 is shown in FIG. 5.

First, it is determined in Step S201 whether the request is a registration/edit request or a download request. Requests processed by the request processing part 202 (FIG. 3) of the information-providing server apparatus 200 include registration/edit requests of the settings information file from the input device 207 by the administrator and settings information file download requests from the gateway apparatus 100. As registration and editing of settings information files, there are the supplementary registration of the settings information file for a developed new-model device and corrections of the information settings files of current-model devices.

In case the request was a download request for a settings information file from the home gateway apparatus 100, it is acceptable to check the signature of the request in order to confirm the legitimacy of the request (Step S202).

In case the validity of the signature is confirmed (OK), the settings information file with respect to the requested device is searched in the device information administration part 201 (Step S203), it is determined whether the settings information file of the concerned device is present (Step S204), and if it is present, that settings information file is transmitted to the requestor, i.e. the home gateway apparatus 100 (Step S205), and the process comes to an end.

In Step S201, in case the request was a registration/edit request from the administrator, the request is authenticated by using the password of the administrator or the certificate of the administrator (Step S206).

It is determined whether the authentication was successful (Step S207), and if it was successful, the device settings information file is registered in the device information administration part 201 (Step S208), in accordance with the registration/edit request.

The case of carrying out business using the present working mode is shown below.

In case the provider of the home gateway apparatus 100 also operates the server apparatus 200, the provider is entrusted by the home appliance device manufacturer with providing information, holds and administers the settings information file, and, together with the home gateway apparatus 100, carries out service provision to the user as a home appliance administration service.

Alternatively, it is also possible to carry out the dissemination of the home gateway apparatus 100 by disclosing the software interface of the device settings processing part 106 of the home gateway apparatus 100 to the home appliance device manufacturers and enabling home appliance device manufacturers to respectively provide administration and settings information for the server apparatus 200.

In the first embodiment, as mentioned above, just by making the setting of the device from the Web browser connected to the residential network NW1, it becomes possible to simultaneously make automatically the device network settings, the packet filters (firewall settings) of the home gateway apparatus 100 and the address translation information settings, so the user can perform supplementary registration of the device in the residential network NW1 without possessing advanced network knowledge.

Second Embodiment

Figure 9:
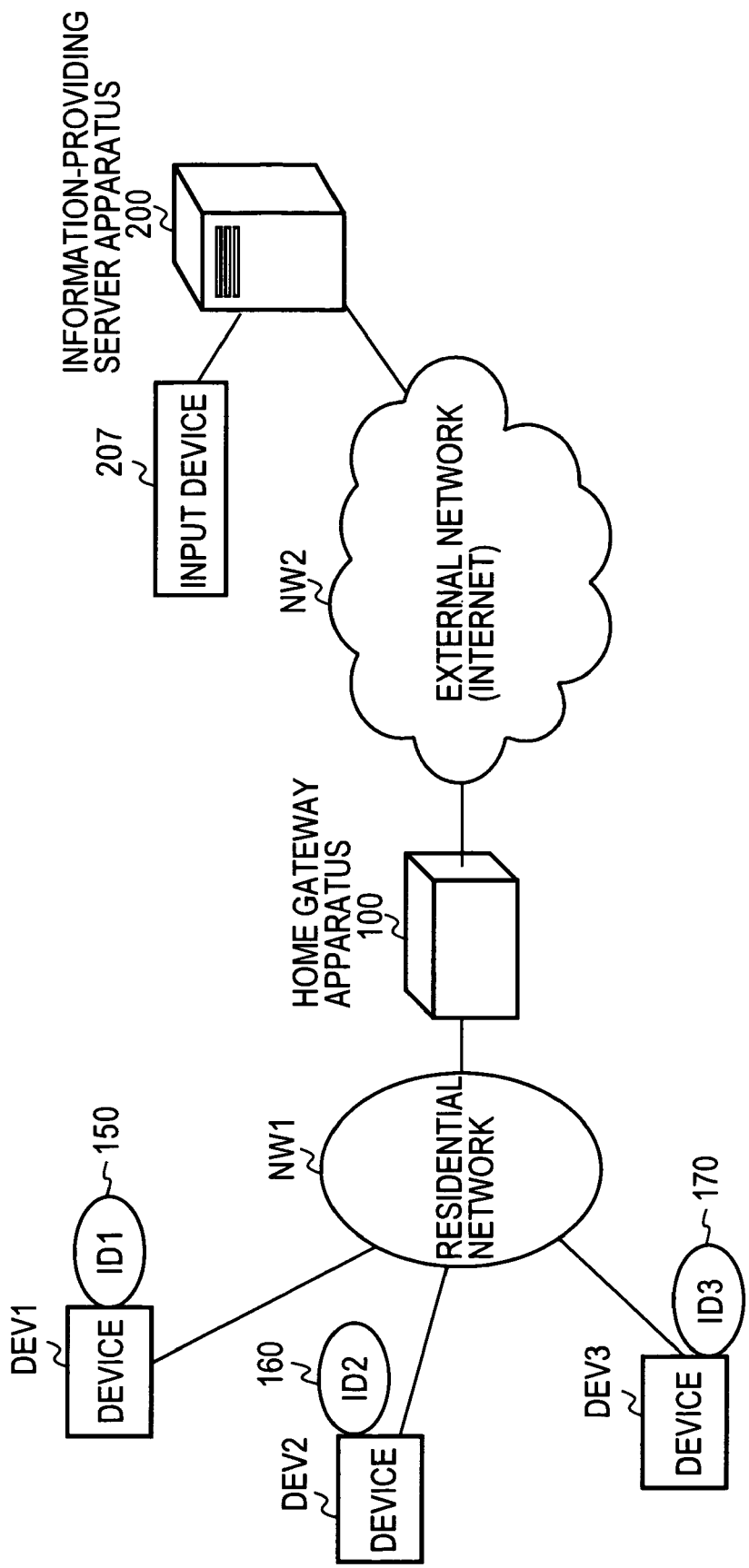
FIG. 9 is a block diagram for explaining another example of a network system to which the present invention is applied.
Figure 10:
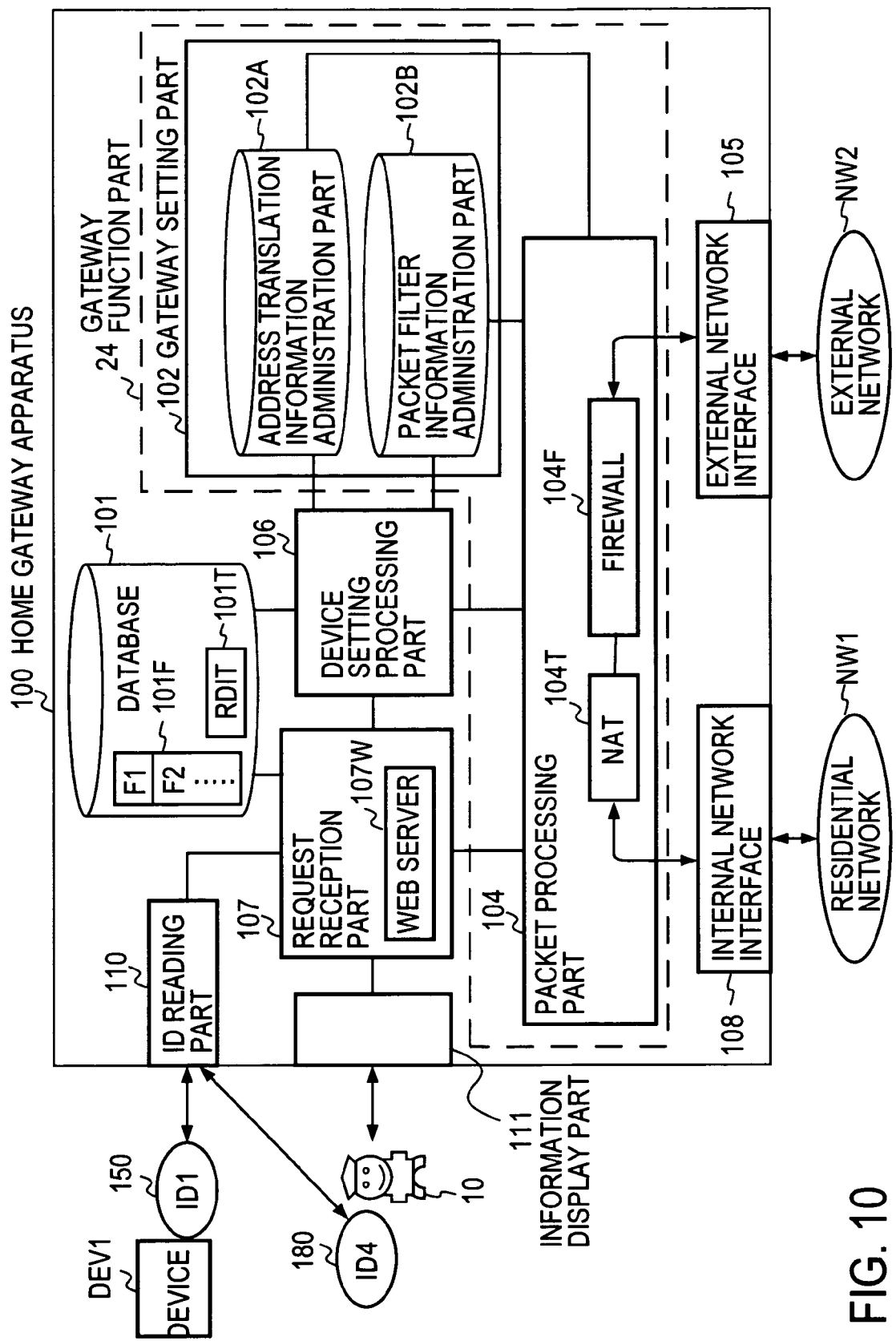
FIG. 10 is a block diagram for explaining the configuration of the internal part of a home gateway apparatus, in the system shown in FIG. 9.

A configuration example of a network system to which the present invention is applied is shown in FIG. 9, and the configuration of a home gateway apparatus in this system, according to this invention, is shown in FIG. 10.

In the second embodiment, as shown in FIG. 9, devices DEV1, DEV2, DEV3 in the residential network NW1 respectively have identity information (ID) media 150, 160, 170, and as shown in FIG. 10, the fact that there is an ID reading part 110 and an information display part 111 inside the home gateway apparatus 100 is different from the first embodiment. The configuration of the information-providing server apparatus 200, the configurations of the home appliance devices DEV1, DEV2, DEV3, the configurations of external network NW2 and the residential network NW1 and the fact that the address translation information administration part 102A and the packet filter information administration part 102B constitute the gateway setting part 102 are the same as those in the first embodiment.

The ID medium 150 is installed in the main part of the device DEV1 or in an IC card, an IC tag, a bar code, or the like, attached to the device DEV1, holds identity information ID1 such as a product number etc. for identifying the device DEV1, and can be used for retrieving settings information such as the device name and the device manufacturer name. It is also the same for the other ID media 160, 170.

The ID reading part 110 provided in the home gateway apparatus 100 has one or more reading apparatuses such as a barcode reader, an IC card reader, or an IC tag reader and is capable of reading the ID medium 150 of the device.

In addition to reading the ID media 150, 160, 170, the ID reading part 110 can also be made to read an ID medium 180 holding identity information ID4 for authenticating user 10.

In the first embodiment, the device setting request was performed via the web browser provided in the residential network NW1, but in the second embodiment, the user makes the reading part 110 of the home gateway apparatus 100 read e.g. the ID medium 150 of the device. At this juncture, the authentication of the user 10 may be performed, with respect to the ID reading part 110, by making it read the user ID medium 180.

The response of the reading result and the display of the device setting result are displayed on the information display part 111. Regarding the procedure for a device connection setting request in the second embodiment, the operation of request reception and authentication (Step S101) in the procedure of FIG. 4 is different from the first embodiment in that they occur via ID reading part 110 and in that the process result response (Step S110) occurs in the information display part 111, but apart from that, the operation is the same as in the first embodiment.

Also, regarding a device which supports UPnP and where the device ID can be provided with the UPnP protocol, it is also possible to detect the presence of the device in the residential network NW1 without going through the ID reading part 110, to read the ID automatically, and to make even the settings of the device and the home gateway apparatus 100.

As mentioned above, in the second embodiment, even in the case where there is no device possessing a web browser in the residential network NW1, it becomes possible to easily perform the designation of the device with respect to the home gateway apparatus 100.

Third Embodiment

Figure 11:
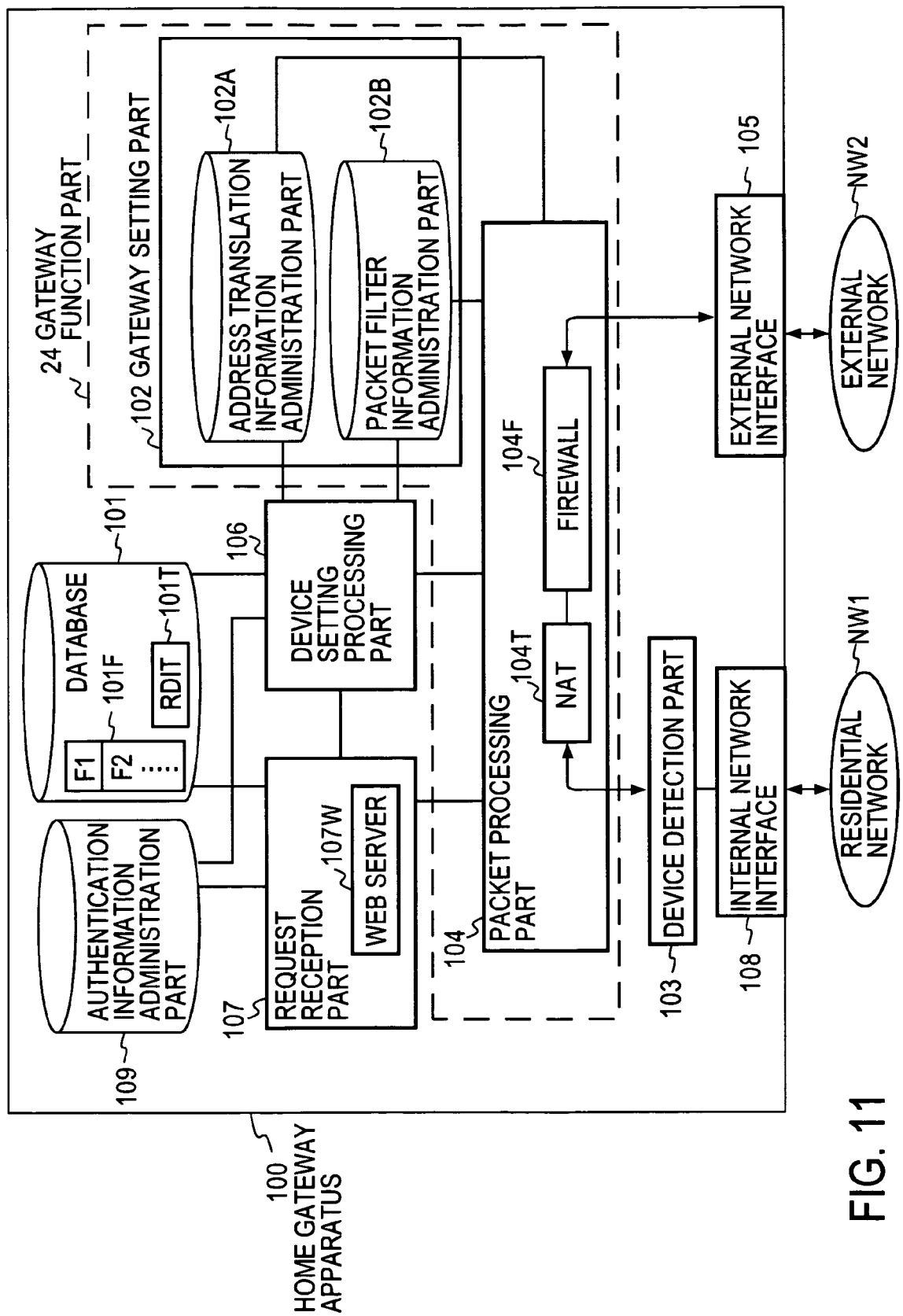
FIG. 11 is a block diagram for explaining a third embodiment of the gateway apparatus of the present invention.

The configuration of the third embodiment of the present invention is shown in FIG. 11.

The home gateway apparatus 100 of the third embodiment differs from home the gateway apparatus 100 of FIG. 2 only in that a device detection part 103 has further been added, the rest of the configuration being the same and the network system in which this apparatus 100 is used also being the same as in FIG. 1.

As shown in FIG. 11, the device detection part 103 is connected to the internal network interface 108. The device detection part 103 monitors packets in the residential network NW1 and, when it detects a device not yet registered, makes an enquiry to the user about whether to register the device.

[Explanation of Operation]

Figure 12:
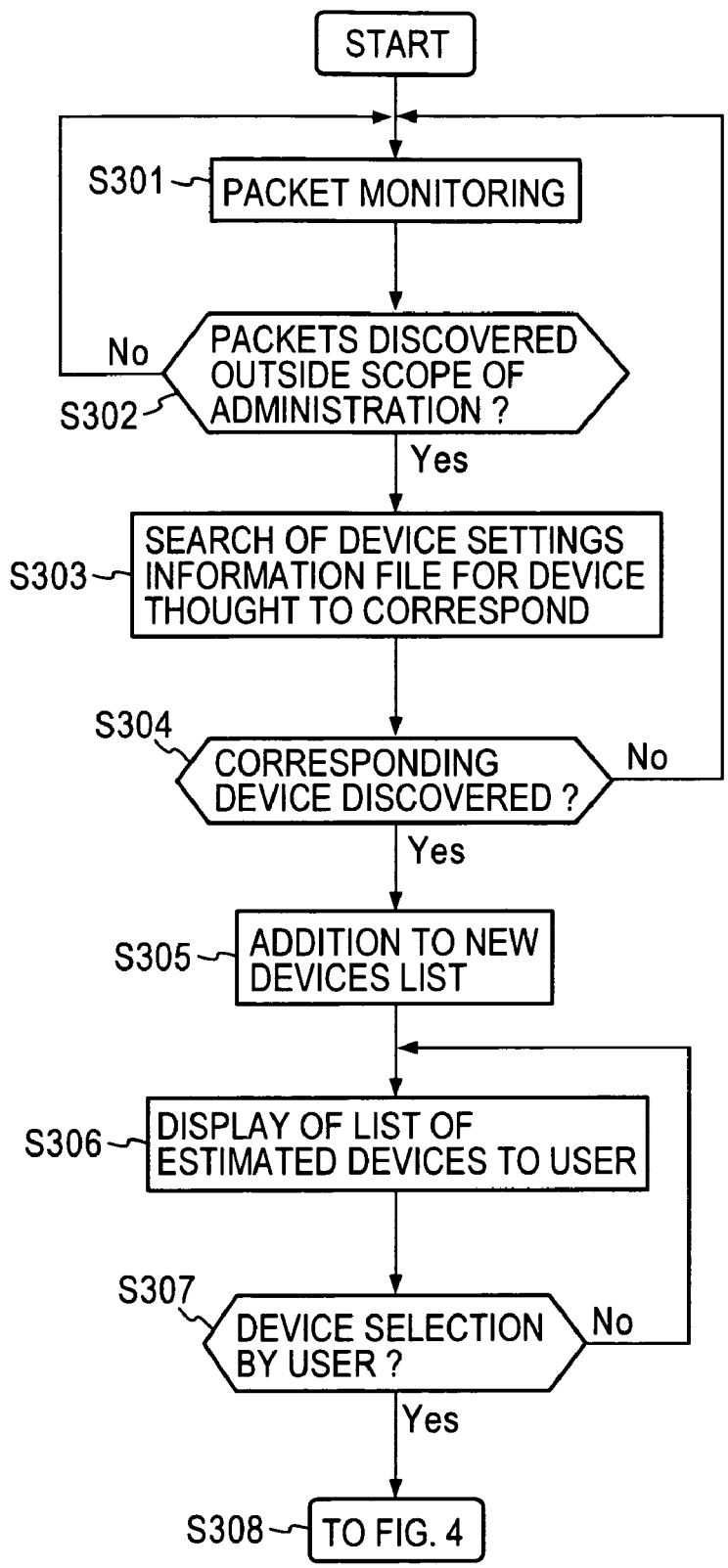
FIG. 12 is a flowchart for explaining the operation of the home gateway apparatus shown in FIG. 11.

The operational flow of the device detection part 103 is shown in FIG. 12.

The device detection part 103 monitors packets in the residential network NW1 (Step S301), and, in case there is found a packet having an address other than a device IP address allocated to a device to which the home gateway apparatus 100 is already connected (Step S302), searches the settings information files in the database 101 for a corresponding device, on the basis of a device IP address and a device external IP address estimated to correspond, and, if nothing is found, returns to Step S301 to resume the monitoring of packets (Step S303). In case devices were found, it saves the list of all devices found for future convenience (Step S305). When the user accesses the Web interface, the fact that a device (devices) has/have newly been added and the list of the corresponding devices is displayed to the user (Step S306).

The user selects a corresponding device from the device list and launches a setting request (Step S307).

The operation mentioned hereinafter has the same operational flow as the mode of the first embodiment shown in FIG. 4.

As mentioned above, in the present third embodiment, there is an additional function for increasing the convenience of the user, as compared with the first embodiment.

When using the present third embodiment, since the home gateway apparatus 100 connected to the residential network NW1 performs a search and a device estimation, it becomes possible to alleviate the effort of the user's retrieving the device name himself.

Fourth Embodiment

Figure 4:
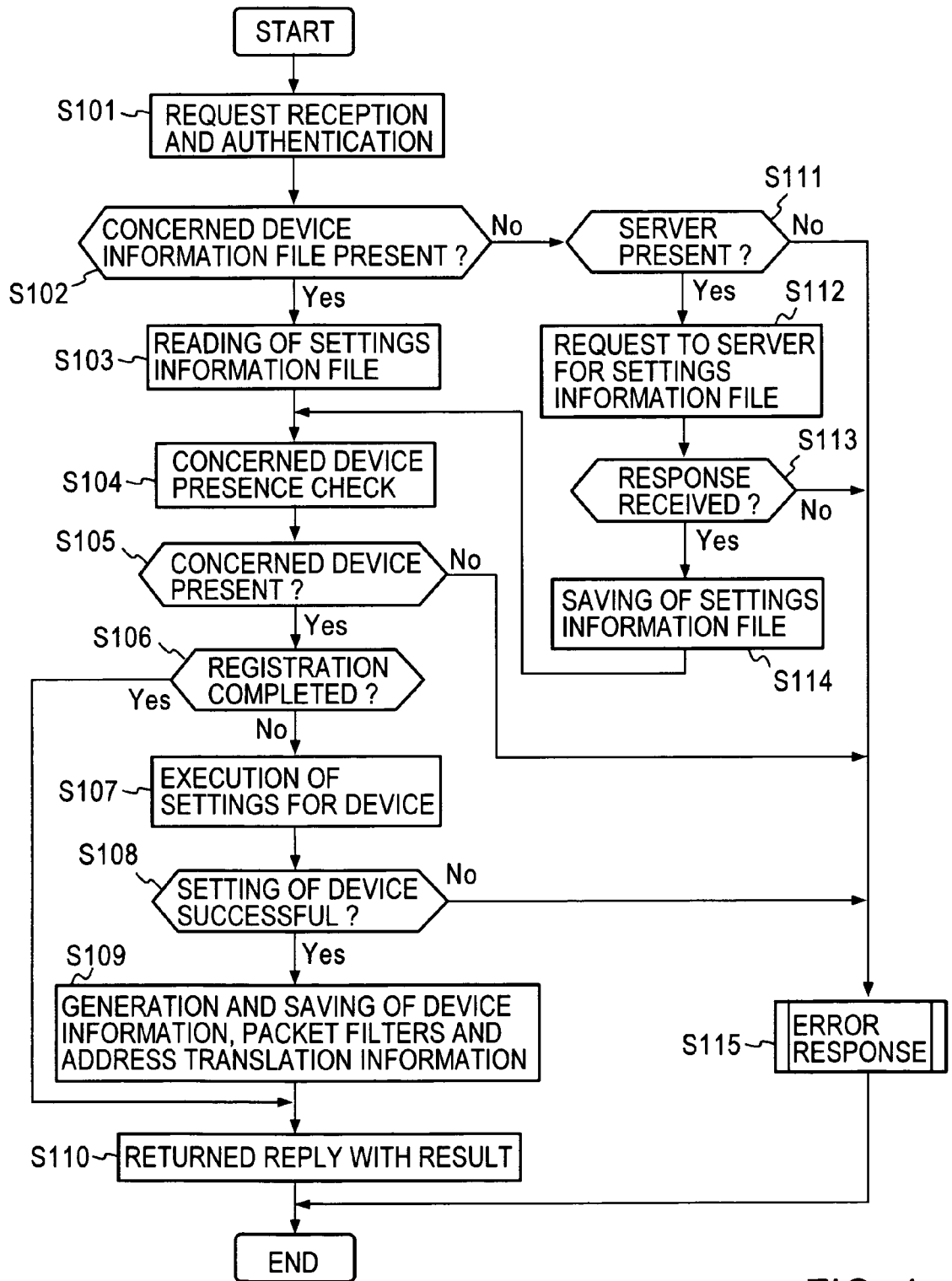
FIG. 4 is a flowchart for explaining the operation of the home gateway apparatus shown in FIG. 2.
Figure 13:
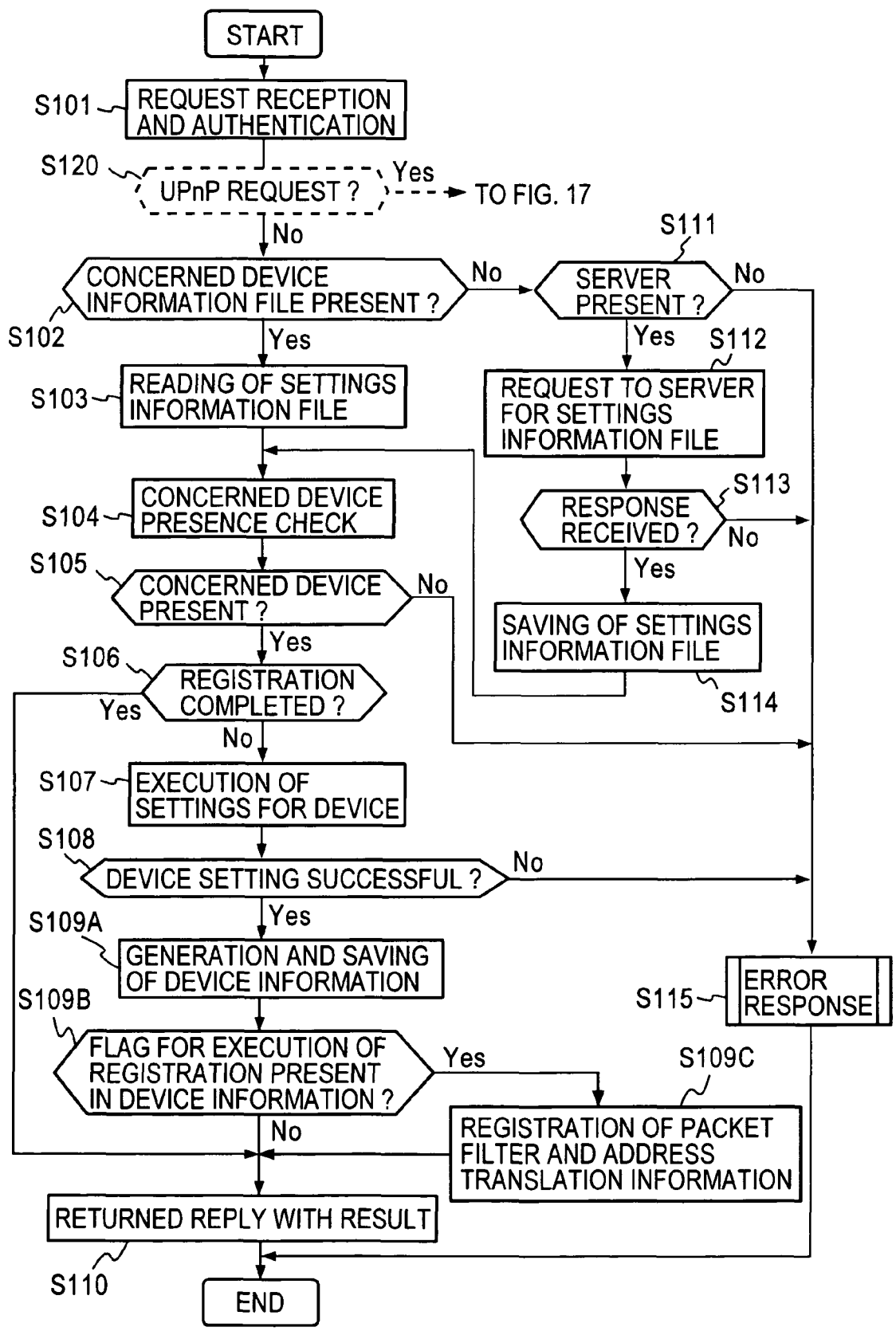
FIG. 13 is a flowchart for explaining the operation of a fourth embodiment wherein the operation of FIG. 4 has been modified.

FIG. 13 shows an embodiment with a modification of the operation shown in FIG. 4 and based on the home gateway apparatus in FIG. 2. In the process explained in FIG. 4, the setting of packet filters and address translation information was executed by default in Step S109. Considering the settings information file for this case, the result is that registration of packet filters and address translation information is executed as e.g. shown in FIG. 6A, if there is no designation regarding the registration of packet filters and address translation information. Supposing that there is no registration of packet filters and address translation information, it is necessary to designate in the settings information file that registration is not executed, as shown e.g. in FIG. 7B.

As against this, it is assumed in the embodiment of FIG. 13 that, by default, the registration of packet filters and address translation information is not executed. Consequently, for the settings information file used in the embodiment of FIG. 13, a designation to execute an instant registration of packet filters (registration execution flag "Yes") is clearly defined in the settings information file, as shown in FIG. 14A for a settings information file F1 corresponding e.g. to the settings information file of FIG. 6A. Moreover, FIG. 14B is an example of a settings information file F2 corresponding to FIG. 6B, the flag for execution of instant registration of packet filters and address translation information not being shown here. Consequently, in the embodiment of FIG. 13, in case the setting is executed based on the settings information of FIG. 14B, registration of packet filters and address translation information is not executed.

In the procedure shown in FIG. 13, Steps S101 to S108 and Steps S111 to S115 are the same as those corresponding steps in FIG. 4, so their explanation will be omitted. If the setting of a device is successful in Step S108, device information to be registered is generated in Step S109A and saved in the registered device information table 101T, as shown in FIG. 15. Consequently, in case the setting was made on the basis of e.g. the settings information file F1 shown in FIG. 14A, the result is that packet filter registration execution flag "Yes" in the registration information of the corresponding device DEV1 is raised, as shown in FIG. 15 for the registered device information table 101T corresponding to FIG. 8, but the registration execution flag in the registration information for device DEV2 is not raised.

It is determined whether or not there is a registration execution flag in the device information for the concerned device in the saved registered device information table 101T (Step S109B) and, if there is one, the packet filters and the address translation information are respectively registered in the packet filter administration part 102B and the address translation information translation part 102A in FIG. 2 (Step S109C), as mentioned above, and registration completion is notified to the device in the residential network used by the user (Step S110). As a consequence of that, it is displayed to e.g. the display part (not illustrated) of the device that the setting has been completed. Even if the packet filters and the address translation information are included in the settings information file, if there is no registration execution flag in the registered device information table 101T, the registration is not carried out and the user is notified to that effect (Step S110).

Step S120, shown with a dashed line in FIG. 13, is a decision step for proceeding to a process based on UPnP functionality in an embodiment in case it is possible to utilize the UPnP functionality to be subsequently described.

Fifth Embodiment

Figure 16:
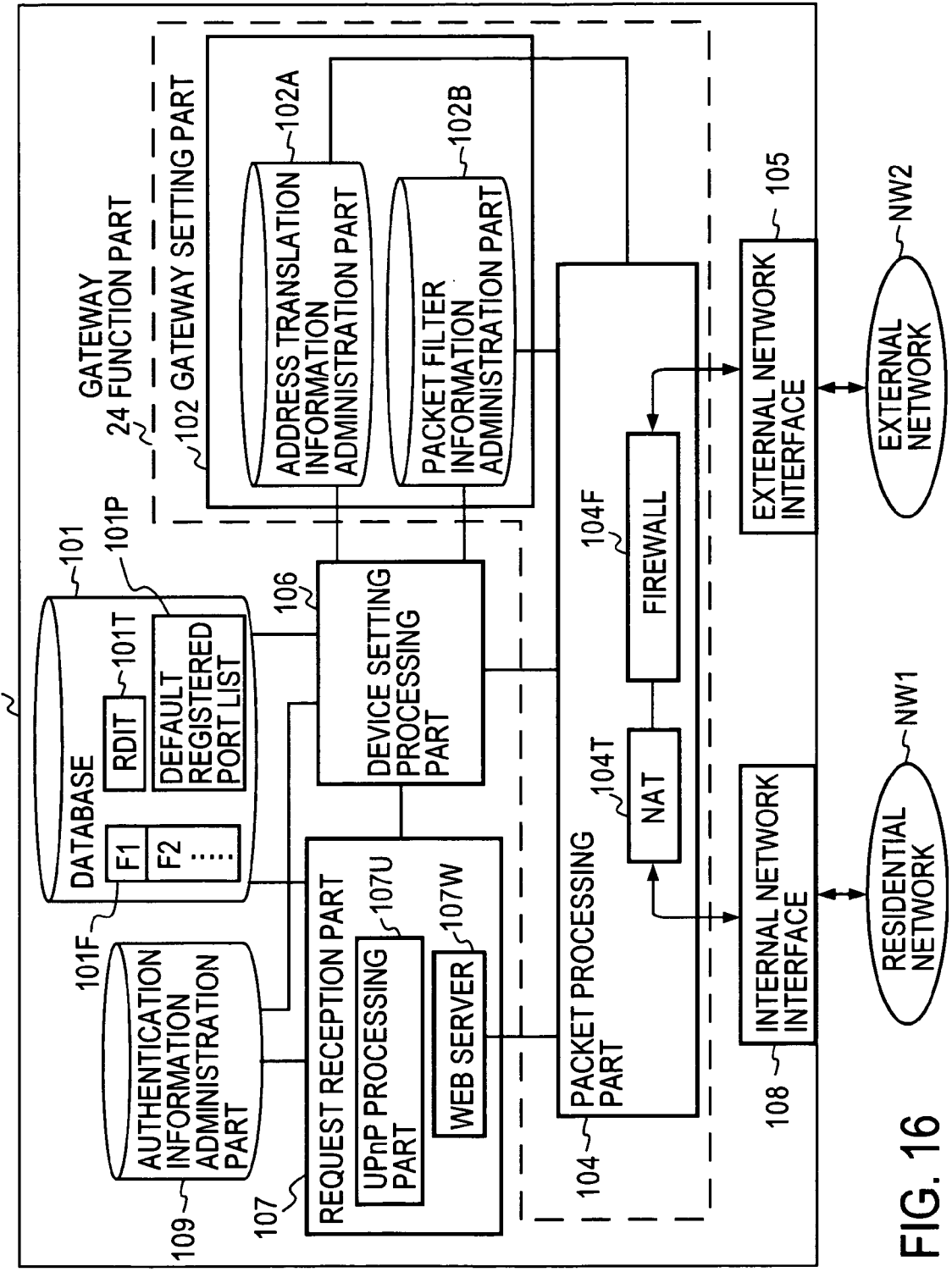
FIG. 16 is a block diagram showing the home gateway apparatus of a fifth embodiment of this invention.

FIG. 16 shows a home gateway apparatus according to a fifth embodiment of this invention. In the fifth embodiment, the connection setting is made by means of the process shown in FIG. 7 in response to a device connection request of the user for a device not possessing UPnP functionality, and for a device possessing UPnP functionality, an automatic setting is made in response to a connection request based on the UPnP functionality of the device.

The connection to the network of a device having UPnP functionality is performed automatically with a setting process between the device and the gateway apparatus by means of intrinsic UPnP functionality. Consequently, e.g. in the setting process of FIG. 4 mentioned above, in case the device to be connected has UPnP functionality, registration of packet filter and address translation information is also performed automatically. However, even for a device having UPnP functionality, the gateway apparatus is not necessarily holding all the information considered to be needed for the setting, so in case the necessary information was not obtained from the device, it ends up with an error (connection setting failure).

Figure 17:
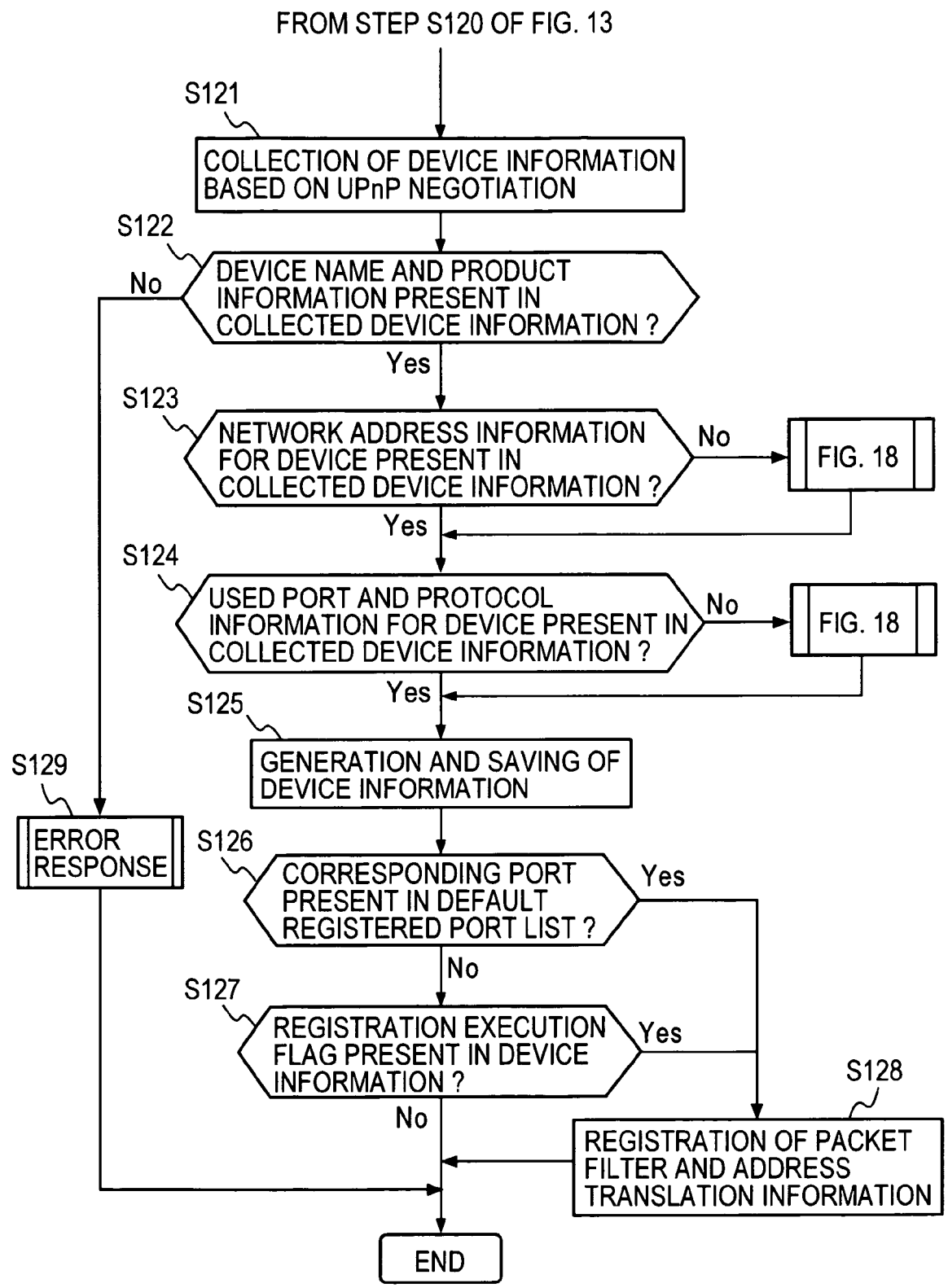
FIG. 17 is a flowchart for explaining a connection setting process based on the apparatus of FIG. 16.

In the fifth embodiment, a UPnP processing part 107U is provided inside the request reception part 107 as shown in FIG. 16, in order to make it possible to also support devices having UPnP functionality. In Step S120 of the connection setting procedure shown in FIG. 13, it is determined whether the connection request is a request based on UPnP, and if it is not a request based on UPnP, Steps S102 to S115 explained in FIG. 13 are executed, and if it is a request based on UPnP, the process of FIG. 17 is executed. In addition, in case the necessary information is not obtained in the process of FIG. 17 based on UPnP, failures of the connection setting process are reduced as much as possible by the process of FIG. 18 by making a search of the settings information file inside the gateway apparatus 100 concerning that information, and by further making a request to the server apparatus 200 if the information is not in the gateway apparatus 100.

Figure 19:
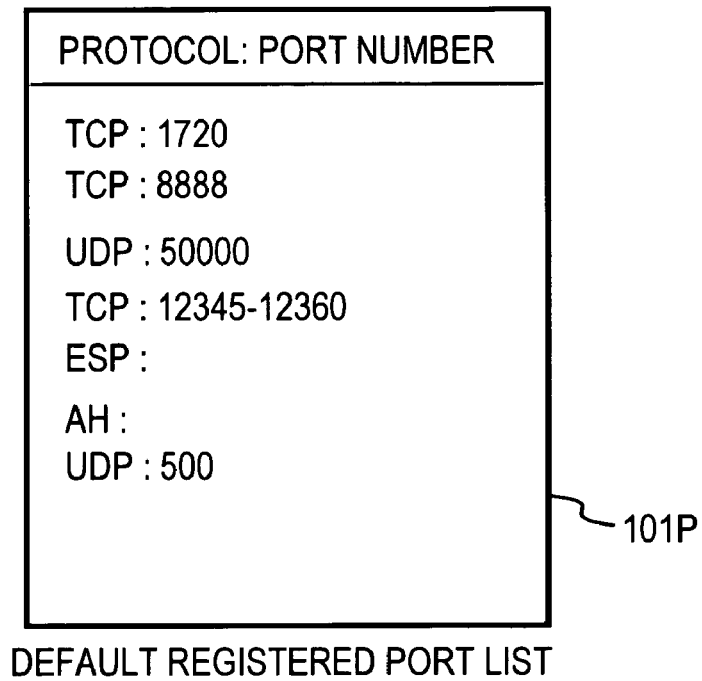
FIG. 19 is a diagram showing an example of a default registered port list.
Figure 20:
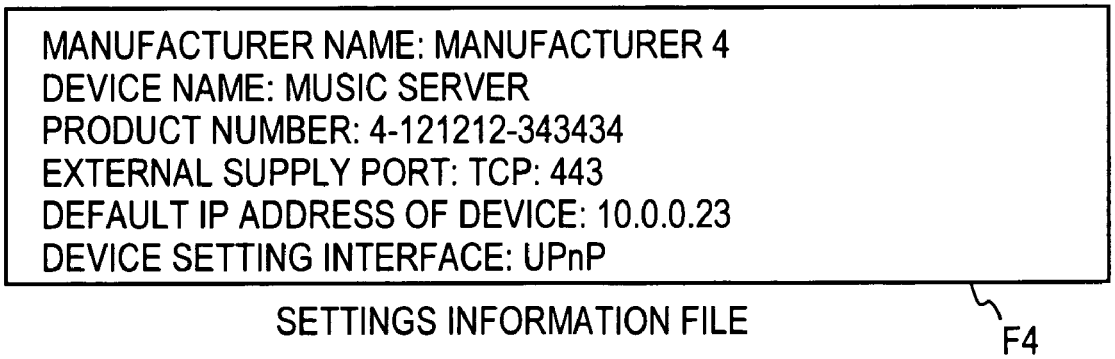
FIG. 20 is a diagram showing an example of a settings information file used in the embodiment of FIG. 16.

The configuration of the gateway apparatus of FIG. 16 is one where a UPnP processing part 107U has further been added in the above-mentioned configuration of FIG. 2 and a default registered port list 101P has been added to the database 101. The default registered port list 101P is a list of default port numbers approved for use with respect to each predetermined protocol, e.g. as shown in FIG. 19, which the user may edit or which may also be obtained from the server apparatus 200. ESP and AH signify the registration of encrypted packets.

In Step S120 of FIG. 13, in case it is determined that the setting request is not a request by the user but a request based on UPnP from the device to be registered, the device information is collected from the device to be connected by UPnP negotiation in Step S121 of FIG. 17. Next, it is determined whether there is a device name and there is product information in the collected device information (Step S122), and if there is not, the process comes to an end by making an error response in Step S129. In case device name and product information are present, it is determined whether there is network address information (device IP address) of the device in the aforementioned collected device information (Step S123). If there is, it is determined in the same way whether there is the used port and protocol information of the device in the collected device information (Step S124). In case the information regarded as necessary in Steps S123, S124 is not present in the collected device information, the necessary information is searched and used by a process of FIG. 18 to be subsequently described.

The necessary information obtained in this way is registered in the registered device information table 101T (FIG. 15) of FIG. 16 (Step S125). It is checked whether the used protocols and the corresponding port numbers in the aforementioned device information are present in default registered port list 101P (Step S126), and if they are, the packet filters and the address translation information are respectively registered in the packet filter information administration part 102B and the address translation administration part 102A in Step S128, irrespective of the presence of a registration execution flag. If they are absent, it is checked whether there is a filter execution flag in the device information registered in Step S125 (Step S127), and, if there is a flag, the IP address and the external port number to be registered in Step S128 as packet filters, from the data in the registered device information, are registered as information that the packets should have, in the packet filter information administration part 102B, together with registering in address translation information administration part 102A the set of the device IP address and the device port number and the set of the external IP address and the external port number as address translation information, and the process comes to an end. If there is no flag, the process comes to an end without the packet filter and address translation information being registered. For a device for which registration was not executed in this way, the user or another program can later consult the registered device information table 101T and perform the registration.

Figure 18:
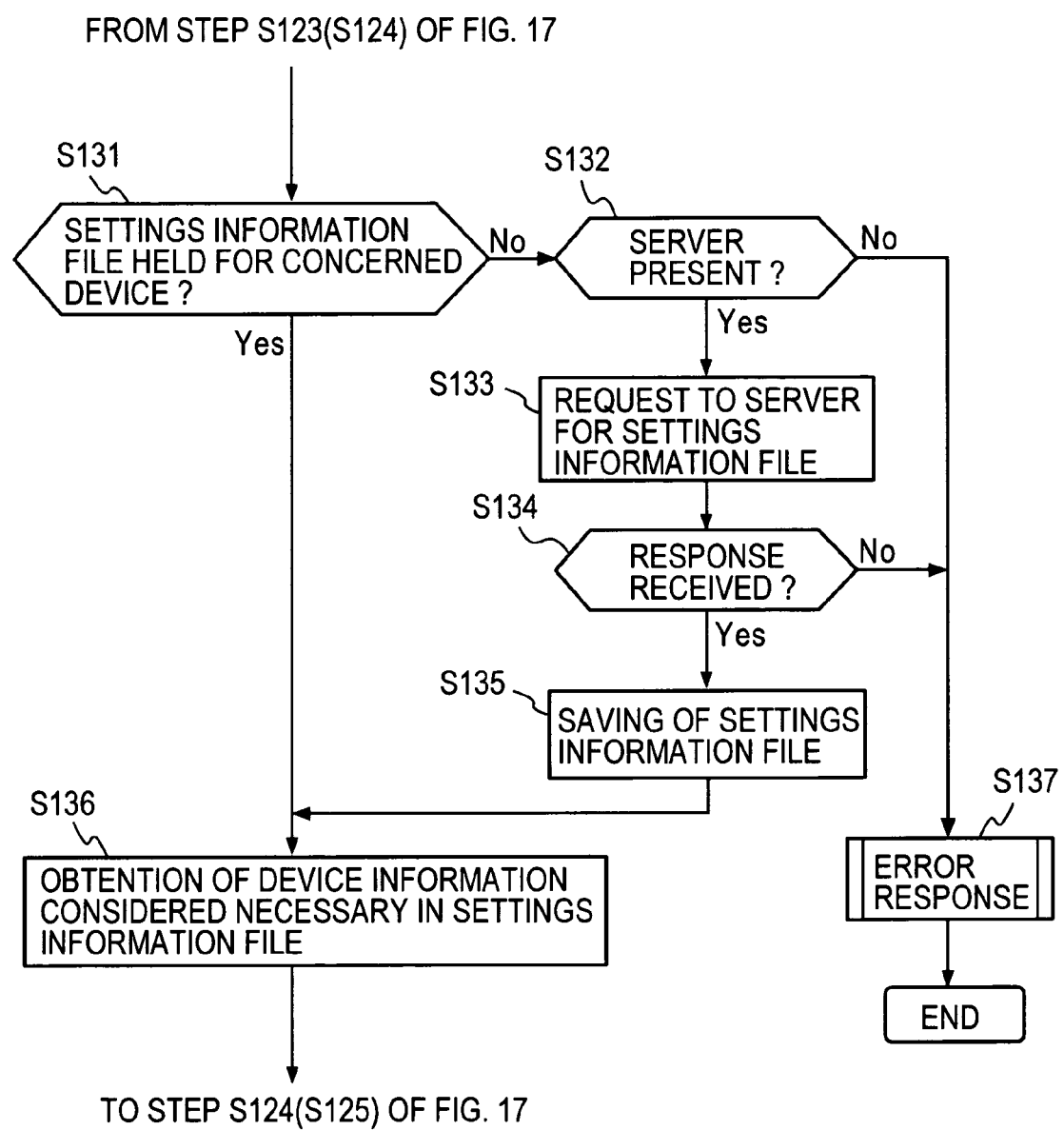
FIG. 18 is a flowchart for explaining the decision branching process in the connection setting process of FIG. 17.

FIG. 18 shows in combination the process in case the address information was not obtained from the device in Step S123 and the process in case the protocol and the port number were not obtained from the device in Step S124.

In case the necessary device information was not obtained in Step S123 (S124), the process moves to Step S131 of FIG. 18, it is checked whether the settings information file of the concerned device is held in the database 101 and, if it is held, the necessary device information is read from the settings information file (Step S136), and the process proceeds to Step S124 (S125) of FIG. 17. In Step S131, if the settings information file of the concerned device is not held in the database 101, the server apparatus 200 is accessed by the web server 107W in Step S132 and, in case access is not possible, an error response is notified and the process comes to an end (Step S137). If access was possible, the settings information file is requested from the server apparatus 200 (Step S133), and it is checked in Step S134 whether the settings information file was received, and if reception was possible, the settings information file is saved in the database 101 (Step S135), the necessary device information in the settings information file is read (Step S136), the process returns to Step S124 (S125), and Steps S124 (S125) to S128 are executed. If it was not possible to receive the settings information file in Step S134, an error response is emitted in Step S137, and the process comes to an end.

The home gateway apparatus 100 of each embodiment explained above can be implemented by installing a home gateway program in accordance with this invention and letting the computer execute the home gateway program. The home gateway program in accordance with this invention is described by means of a programming language which can be decoded by a computer and is composed of a home gateway program operated as a home gateway apparatus of this invention. The home gateway program in accordance with this invention is recorded in a storage medium, such as e.g. a magnetic disk or a CD-ROM (Compact Disc—Read Only Memory) that can be read by the computer, and can be installed in the computer from these storage media or can be installed via a communication line, the installed home gateway program being decoded by the CPU (Central Processing Unit) provided in the computer and operating as a home gateway apparatus.

INDUSTRIAL APPLICABILITY

The home gateway apparatus in accordance with this invention makes it possible, when networking functionality is added to home appliance products utilized in the home, to control these home appliance products from the outside and will be put to practical use in the field of home appliance products.

What is claimed is:

1. A residential network setting method of making connection settings of a new device to a residential network by using a home gateway apparatus which comprises a gateway function part including at least a firewall and a network address translator for controlling transit of packets between the residential network and an external network, and a database holding software for connection settings, a file of settings information for expected devices that are expected to be connected to the residential network, and a table of registered device information for each of registered devices that are successful in connection settings, said settings information for each expected device including attribute information of the expected device, default IP address, interface information for setting the expected device, commands transmitted via an interface specified in the interface information in order that the home gateway apparatus be able to administer connection settings of the expected device to said residential network, said method being performed by the home gateway apparatus and comprising the steps of:

(a) receiving a request for connection settings of the new device from a user who wants the new device to be connected to the residential network, said request including attribute information pertaining to said device;

(b) querying by using said attribute information whether or not said database holds a settings information pertinent to said new device, and in case the settings information is held in said database, acquiring the settings information from said database, and in case the settings information is not held in said database, accessing an information-providing server connected to the external network and acquiring the desired settings information from the information-providing server and holding this settings information in said database;

(c) executing the connection settings of the new device to the residential network by using the thus acquired settings information pertinent to the new device;

(d) determining whether or not the connection settings of the new device are successful, and in case of success, registering a device information of the new device that is regarded as a registered new device, said device information of the registered new device including the attribute information of the new device, device hardware address, device protocol, device IP address, device port number, external IP address, and external port number, in the table of registered device information;

(e) deriving from the device information of the registered new device a packet filter information including the external IP address and external port number, so that a packet filter settings with respect to the registered new device is performed in the firewall by referring to the thus derived packet filter information; and (f) deriving from the device information of the registered new device a network address translation information including a set comprising the device IP address and the device port number and a set comprising the external IP address and the external port number with respect to the registered new device, so that a network address translation settings between the device IP address and the external IP address with respect to the registered new device is performed in the network address translator by referring to the thus derived network address translation information;

whereby, in response to the user's request for connection settings of the new device, the connection settings as well as the network address translation settings and the packet filter settings with respect to the new device are performed by the home gateway apparatus.

2. The residential network setting method according to claim 1, wherein said Step (a) includes
(a1) a step of receiving said connection setting request by means of a web server.

3. The residential network setting method according to claim 1, wherein said Step (a) includes
(a1) a step of receiving said connection setting request from a device having Universal Plug and Play (UPnP) functionality.

4. The residential network setting method according to claim 1, wherein said Step (a) includes
(a1) a step of receiving identity information for the device or the user as said request for connection settings.

5. The residential network setting method according to claim 1, wherein said Step (a) includes
(a1) a step of detecting packets having an address not registered in said residential network, searching said file of settings information for the expected devices so as to find all corresponding devices which correspond to said not registered address and are not yet registered, and displaying a list of all corresponding devices found in the search, and
(a2) a step of receiving a device selection designation from said list as said request for connection settings.

6. The residential network setting method according to claim 1, which further comprises the steps of:
(g) determining whether or not said request for connection received in said Step (a) is a request based on Universal Plug and Play (UPnP) and
(g1) if said request for connection settings is not the request based on Universal Plug and Play (UPnP); executing said Steps (b) to (f); and
(g2) if said request for connection settings is the request based on Universal Plug and Play (UPnP),
(g2-1) collecting the device information of the new device by means of a Universal Plug and Play (UPnP) negotiation with said new device,
(g2-2) making the connection settings of said new device if there is necessary information that is necessary for connection settings in said collected device information,
(g2-3) in case there is a lack in the necessary information in said collected device information, consulting said database as to whether or not the database holds the settings information pertinent to the new device, and if there is the corresponding settings information in the database, requesting the lacked information to be downloaded from the settings information of said new device, and, if there is no corresponding settings information file in said database, consulting said information-providing server as to whether or not the information-providing server holds the settings information pertinent to the new device and if there is the corresponding settings information in the information-providing server, acquiring the lacked information from the settings information in the information-providing server for said new device, and
(g2-4) in case the acquiring of the lacked information is successful, registering the device information for the new device in the table of the registered device information and making the network address translation settings, and the packet filter settings on the basis of the network address translation information and the packet filter information that are derived from the registered device information of the new device.

7. The residential network setting method according to claim 1, which, after the Step (b), further comprises steps of:

(bb) transmitting a reply request to the default IP address described in the thus acquired settings information pertinent to the new device to determine whether or not the device is present in the residential network due to whether or not a reply is received, and (bbb) determining whether or not the device information of the new device is registered in the table of registered device information of the database and, in the case of the device information being registered, advising the user that the connection settings of the new device is completed, or in the case of the device information not being registered, proceeding in the successive Step (c).

8. A home gateway apparatus, comprising:

a packet processing means including a firewall and a network address translation means for controlling transit of packets between a residential network and an external network;

a database holding software for connection settings, a file of settings information for expected devices that are expected to be connected to the residential network and a table of registered device information for each of registered devices that are successful in connection settings to the residential network, said settings information for each expected device including attribute information of the expected device, default IP address, interface information for setting the expected device, commands transmitted via an interface specified in the interface information in order that the home gateway apparatus be able to administer connection settings of the expected device to the residential network;

a device settings processing means;

a gateway setting means including a packet filter information administration means and an address translation information administration means; and a request receiving means for receiving a request for connection settings of a new device from a user who wants the new device to be connected to the residential network, said request including attribute information of the new device; wherein said device settings processing means (a) queries in response to receipt of the connection settings request whether or not the database holds settings information pertinent to the new device, and in case the pertinent settings information is held in the database, acquires the settings information from the database, and in case the settings information is not held in the database, accesses an information-providing server connected to the external network, acquires the desired settings information from the information-providing server, and holds the thus acquired settings information in the database;

(b) executes connection settings of the new device to the residential network by using the thus acquired settings information;

(c) determines whether or not the connection settings of the new device are successful, and in case of success, registers a registered device information of the new device which includes the attribute information of the new device, device hardware address, device protocol, allocated device IP address, allocated device port number, external IP address, and external port number, in the table of registered device information;

(d) registers a network address translation information including a set comprising the device IP address and the device port number, and a set comprising the external IP address and the external port number with respect to the new device in the address translation information administration means so that a network address translation settings between the device IP address and the external IP address with respect to the new device is set in the network address translation means by referring to the thus registered network address translation information; and (e) registers a packet filter information including the external IP address and external port number with respect to the new device in the packet filter information administration means so that a packet filter setting with respect to the new device in the firewall is performed by referring to the thus registered packet filter information;

whereby the connection settings to the residential network as well as the network address translation settings and the packet filter settings with respect to the new device are performed by the home gateway apparatus in response to the user's request for connection settings of the new device.

9. The home gateway apparatus according to claim 8, further comprising:

a means for accessing the information-providing server connected to said external network, in case the settings information of said new device is not held in said database, and a means for storing in said database the settings information acquired from the information-providing server.

10. The home gateway apparatus according to claim 9, further comprising an authentication means performing authentication between the home gateway apparatus and said information-providing server, on the basis of authentication information held in said home gateway apparatus, when accessing said information-providing server.

11. The home gateway apparatus according to any of claims 8 to 10, further comprising a web server receiving, from said new device, said connection setting request.

12. The home gateway apparatus according to any of claims 8 to 10, further comprising an identifier reading means receiving identity information from said new device as said connection setting request.

13. The home gateway apparatus according to any of claims 8 to 10, further comprising a device detection means for monitoring packets in said residential network and detecting a new packet emitted from a new device and possessing a device IP address other than registered device IP addresses allocated to devices already registered in said residential network, and a display means displaying that the new device is present as being not yet successful in connection settings.

14. The home gateway apparatus according to any of claims 8 to 10, wherein:

there is further stored in said database a default port list showing a list of default port numbers approved for use with respect to each pre-determined protocol;

said home gateway apparatus further includes a Universal Plug and Play (UPnP) processing means performing a negotiation with the new device, if the new device has Universal Plug and Play (UPnP) functionality, to collect information of the new device, determining whether or not there are network address information as well as used port number and protocol information in the collected device information, and in case the network address information and used port number and protocol information are present in the collected device information, generating and saving the device information of the new device in the table of the registered device information, and in case there is a lack in the necessary information, consulting said database or said information-providing server as to whether or not the necessary information is held and acquiring the necessary information; and said device setting processing means registering the network address translation information and the packet filter information with respect to the new device in the address translation information administration means and the packet filter information administration means, respectively, in the case of the used port numbers in said registered device information being included in said default port list, or in the case of the port numbers not being included in said default port list, there is a registration execution flag in said registered device information of the new device.

15. A storage medium storing a program which controls a home gateway apparatus comprising a gateway function part that includes packet processing means including a firewall and a network address translation means for controlling transit of packets between a residential network and an external network and a gateway setting means including a packet filter information administration means and an address translation information administration means, and a database holding software for connection settings, a file of settings information for expected devices that are expected to be connected to the residential network and a table of registered device information for each of registered devices that are successful in connection settings to the residential network, said settings information for each expected device including attribute information of the expected device, default IP address, interface information for setting the expected device, commands transmitted via an interface specified in the interface information in order that the home gateway apparatus be able to administer connection settings of the expected device to said residential network, said program comprising the steps of:

(a) receiving a request for connection settings of a new device from a user who wants the new device to be connected to the residential network, said request including attribute information pertaining to the new device;

(b) querying in response to the request whether or not said database holds a settings information pertinent to the new device, and in case the pertinent settings information is held in the database, acquiring the settings information from the database, and in case the settings information is not held in said database, accessing an information-providing server connected to the external network, and acquiring the desired settings information from the information-providing server, and holding thus acquired settings information;

(c) executing connection settings of the new device to the residential network by using the thus acquired settings information pertinent to the new device;

(d) determining whether or not the connection settings of the new device are successful, and in case of success registering a registered device information of the new device which includes the attribute information of the new device, device hardware address, device protocol, allocated device IP address, allocated device port number, external IP address, and external port number, in the table of registered device information;

(e) storing a packet filter information which includes the external IP address and external port number in the packet filter information administration means so that packet filter settings with respect to the new device in the firewall are performed by referring to the thus registered packet filter information; and (f) storing a network address translation information which includes a set comprising the device IP address and the device port number and a set comprising the external IP address and the external port number with respect to the new device in the address translation information administration means so that setting of network address translation between the device IP address and the external IP address with respect to the new device in the network address translation means is performed by referring to the thus registered network address translation information.

* * * * *